(12) United States Patent
He et al.

(10) Patent No.: US 11,974,707 B2
(45) Date of Patent: May 7, 2024

(54) WATER TANK FOR SWEEPER AND SWEEPER COMPRISING SAME

(71) Applicant: MIDEA ROBOZONE TECHNOLOGY CO., LTD., Suzhou (CN)

(72) Inventors: Bo He, Suzhou (CN); Xiaowei Xu, Suzhou (CN); Xiaogang Zhu, Suzhou (CN)

(73) Assignee: MIDEA ROBOZONE TECHNOLOGY CO., LTD., Suzhou Jiangsu (CN)

( * ) Notice: Subject to any disclaimer, the term of this patent is extended or adjusted under 35 U.S.C. 154(b) by 351 days.

(21) Appl. No.: 17/436,611

(22) PCT Filed: Aug. 15, 2019

(86) PCT No.: PCT/CN2019/100832
§ 371 (c)(1),
(2) Date: Sep. 6, 2021

(87) PCT Pub. No.: WO2020/181724
PCT Pub. Date: Sep. 17, 2020

(65) Prior Publication Data
US 2022/0151451 A1    May 19, 2022

(30) Foreign Application Priority Data
Mar. 12, 2019  (CN) .......................... 201910185197.3

(51) Int. Cl.
*A47L 11/40*    (2006.01)
*A47L 11/24*    (2006.01)

(52) U.S. Cl.
CPC .......... *A47L 11/4083* (2013.01); *A47L 11/24* (2013.01); *A47L 2201/00* (2013.01)

(58) Field of Classification Search
CPC .. A47L 11/4083; A47L 11/24; A47L 2201/00; A47L 11/40; A47L 11/4036; Y02A 20/00
See application file for complete search history.

(56) References Cited

U.S. PATENT DOCUMENTS 10,292,553 B1 * 5/2019 Ebrahimi Afrouzi ... A47L 7/009
11,134,819 B2 * 10/2021 Li ........................ A47L 11/4041
(Continued)

FOREIGN PATENT DOCUMENTS

| CN | 204105903 U | 1/2015 |
|---|---|---|
| CN | 204600371 U | 9/2015 |

(Continued)

OTHER PUBLICATIONS

Search Report dated Apr. 14, 2022 for EP application 19933481.4.
(Continued)

*Primary Examiner* — Shawn M Braden

(57) ABSTRACT

A water tank for a sweeper and a sweeper including the same are provided. The water tank for the sweeper includes: a water tank lower cover, a bottom of which is provided with a containing groove; a water tank upper cover, which is connected with the water tank lower cover; a water tank release button arranged at the containing groove; and a reset member, a first end of which is coupled to the water tank release button and a second end is coupled to the water tank lower cover.

19 Claims, 6 Drawing Sheets

(56) References Cited

U.S. PATENT DOCUMENTS

| | | |
|---|---|---|
| 2004/0049877 A1 | 3/2004 | Jones et al. |
| 2015/0143646 A1 | 5/2015 | Jeong et al. |
| 2016/0058256 A1 | 3/2016 | Ju et al. |

FOREIGN PATENT DOCUMENTS

| | | |
|---|---|---|
| CN | 105433863 A | 3/2016 |
| CN | 105455734 A | 4/2016 |
| CN | 205433581 U | 8/2016 |
| CN | 205458439 U | 8/2016 |
| CN | 106108776 A | 11/2016 |
| CN | 205729251 U | 11/2016 |
| CN | 106264330 A | 1/2017 |
| CN | 106667380 A | 5/2017 |
| CN | 106889951 A | 6/2017 |
| CN | 107252284 A | 10/2017 |
| CN | 107320020 A | 11/2017 |
| CN | 207253312 U | 4/2018 |
| CN | 207640328 U | 7/2018 |
| CN | 108433654 A | 8/2018 |
| CN | 108443512 A | 8/2018 |
| CN | 108720742 A | 11/2018 |
| CN | 108852185 A | 11/2018 |
| CN | 208081173 U | 11/2018 |
| CN | 109222762 A | 1/2019 |
| CN | 208342849 U | 1/2019 |
| CN | 109330473 A | 2/2019 |
| CN | 208582332 U | 3/2019 |
| CN | 209091195 U | 7/2019 |
| CN | 209750931 U | 12/2019 |
| EP | 1969438 A1 | 9/2008 |
| EP | 3241477 A1 | 11/2017 |
| JP | S5226470 A | 2/1977 |
| JP | H0385127 A | 4/1991 |
| KR | 100768012 B1 | 10/2007 |
| KR | 100784723 B1 | 12/2007 |
| KR | 20080022342 A | 3/2008 |
| KR | 20120105807 A | 9/2012 |
| KR | 20140000811 A | 1/2014 |
| KR | 20190022844 A | 3/2019 |
| WO | 2016008446 A1 | 1/2016 |

OTHER PUBLICATIONS

Search Report dated Apr. 12, 2022 for EP application 19918835.0.
First OA dated Jun. 1, 2022 for CN application 201910111720.8.
ISR for PCT application PCT/CN2019/100832.
First OA for CN application 201910185197.3.
Second OA for CN application 201910185197.3.
OA dated Oct. 4, 2022 for JP application 2021-554771.
OA received in KR application 10-2021-7031322; dated Jan. 12, 2023.
OA received in KR application 10-2021-7024191; dated Feb. 14, 2023.
First OA received in CN application 201811168860.0; dated Jul. 27, 2023.

\* cited by examiner ized, and the machine body does not need to be turned over for assembly and detachment, facilitating water filling; additionally, separation of the water tank from the machine body can be realized by triggering the water tank release button with one hand and drawing rearwards, greatly simplifying the process of detachment of the water tank from the machine body.

WATER TANK FOR SWEEPER AND SWEEPER COMPRISING SAME

CROSS-REFERENCES TO RELATED APPLICATIONS

The present disclosure is a national phase application of International Application No. PCT/CN2019/100832, filed on Aug. 15, 2019, which claims priority to Chinese Patent Application Serial No. 201910185197.3, filed on Mar. 12, 2019, the entireties of which are herein incorporated by reference.

FILED

The present disclosure relates to the field of cleaning appliances, and more particularly to a water tank for a sweeper and a sweeper having the same.

BACKGROUND

In the related art, with sustained social development and technological improvement, intelligent household appliances are gradually entering thousands of families. At present, commonly used intelligent household appliances are mainly household robot vacuum cleaners, and mopping functions are getting more and more attention from users.

Currently, sweepers with mopping functions have particular water tank devices, which are divided into two types of electric water tanks and gravity water tanks. The electric water tank contains a water pump. Although the electric water tank can control amount of output water and has good user experience, it has high costs, a complicated structure and is easy to damage. The gravity water tank is still prevalent, and has low costs and a simple structure. Moreover, the gravity water tank may be optional, and can be removed at any time when not in use.

However, the gravity water tanks currently available on the markets have disadvantages of difficulty in assembly and disassembly of the water tank and inconvenience in the water filling.

SUMMARY

The present disclosure seeks to solve at least one of the problems existing in the related art to at least some extent. In view of this, an embodiment of the present disclosure is to propose a water tank for a sweeper, the water filling for the water tank is convenient, and mounting and detachment on a machine body of the sweeper can be easily realized.

Another embodiment of the present disclosure is to propose a sweeper including the above-described water tank.

In the water tank for the sweeper according to embodiments of a first aspect of the present disclosure, the water tank is configured to be pulled in and out a rear side of a machine body of the sweeper, and the water tank includes: a water tank lower cover, a bottom of the water tank lower cover defining a containing groove; a water tank upper cover coupled to the water tank lower cover and the water tank upper cover and the water tank lower cover defines a water storage chamber there between; a water tank release button provided at the containing groove and configured to disengage the water tank from the machine body when the water tank release button is triggered; and a reset member having a first end coupled to the water tank release button and a second end coupled to the water tank lower cover.

In the water tank for the sweeper according to embodiments of the present disclosure, the water tank is configured to be pulled in and out at the rear side of the machine body of the sweeper, assembly and detachment of the water tank and the machine body can be easily realized, and the machine body does not need to be turned over for assembly and detachment, facilitating water filling; additionally, separation of the water tank from the machine body can be realized by triggering the water tank release button with one hand and drawing rearwards, greatly simplifying the process of detachment of the water tank from the machine body.

Additionally, the water tank for the sweeper according to embodiments of the present application may further have the following additional features.

According to some embodiments of the present disclosure, the water tank release button is pivotally provided at the containing groove.

Further, one of the water tank release button and the water tank lower cover is provided with a pivot shaft and the other defines a pivot hole, and the pivot shaft is mated with the pivot hole.

In one embodiment, a free end of the water tank release button forms a snap-fitting part protruded upwards, the water tank lower cover defines a first via hole in communication with the containing groove, the water tank upper cover defines a second via hole corresponding to the first via hole, the snap-fitting part passes through the first via hole and the second via hole and protrudes from an upper surface of the water tank upper cover; and the machine body defines a snap-fitting slot mating with the snap-fitting part.

Further, the water tank upper cover is provided with a locking part, a first positioning guide groove and a second positioning guide groove, the locking part is located at a rear side of the second via hole and adjacent to the second via hole, the first positioning guide groove and the second positioning guide groove are defined in left and right opposite sides of the water tank upper cover; and the machine body is provided with a locking position, a first positioning block and a second positioning block, the locking position is provided at a rear side of the snap-fitting slot and mated with the locking part, the first positioning block is fitted with the first positioning guide groove, and the second positioning block is fitted with the second positioning guide groove.

According to some embodiments of the present disclosure, an inner bottom wall of the water tank release button forms a first positioning part, the bottom of the water tank lower cover forms a second positioning part corresponding to the first positioning part, and the reset member has the first end coupled to the first positioning part and the second end coupled to the second positioning part.

Further, the first positioning part is a cross-shaped protruding rib, and the second positioning part is a positioning sleeve.

Further, the positioning sleeve is provided at an outer bottom wall of the water tank lower cover and extends downwards.

According to some embodiments of the present disclosure, the reset member is a reset spring, a lower end of the reset spring is fitted over an outside of the cross-shaped protruding rib and abuts against an inner bottom face of the water tank release button, and an upper end of the reset spring is inserted inside the positioning sleeve and abuts against an inner bottom face of the positioning sleeve.

In one embodiment, a bottom wall of the water tank upper cover forms a sunken bump, the water tank lower cover defines a water outlet hole in communication with the water storage chamber, and the bump is in clearance fit with the water outlet hole.

Further, the bump is formed by sinking the bottom wall of the water tank upper cover downwards, and the bump protrudes downwards from an outer bottom wall of the water tank upper cover.

According to some embodiments of the present disclosure, the bump is provided at a middle or a front of the water tank upper cover in a front-and-rear direction, and a projection of the bump on the bottom wall of the water tank upper cover has an oblong, circular, or elliptic shape.

Further, the water tank further includes a water-filling plug, the water tank upper cover defines a water-filling hole, and the water-filling plug is detachably provided at the water-filling hole.

Furthermore, the water tank further includes a purification slow flow member provided at an inner bottom wall of the water tank lower cover.

Further, the purification slow flow member is filter cotton.

In one embodiment, the inner bottom wall of the water tank lower cover forms a limitation protruding rib to limit the purification slow flow member.

Further, the water tank further includes a mop fabric provided at an outer side of a bottom wall of the water tank lower cover.

In one embodiment, the mop fabric is bound or snap-fitted with the water tank lower cover.

According to some embodiments of the present disclosure, the water tank upper cover and the water tank lower cover are coupled by ultrasonic welding.

The sweeper according to embodiments of a second aspect of the present disclosure includes a water tank for a sweeper described above.

Additional embodiment of the present disclosure will be given in part in the following descriptions, become apparent in part from the following descriptions, or be learned from the practice of the present disclosure.

BRIEF DESCRIPTION OF THE DRAWINGS

Embodiments of the present disclosure will become apparent and more readily appreciated from the following descriptions made with reference to the drawings, in which.

Figure 1:
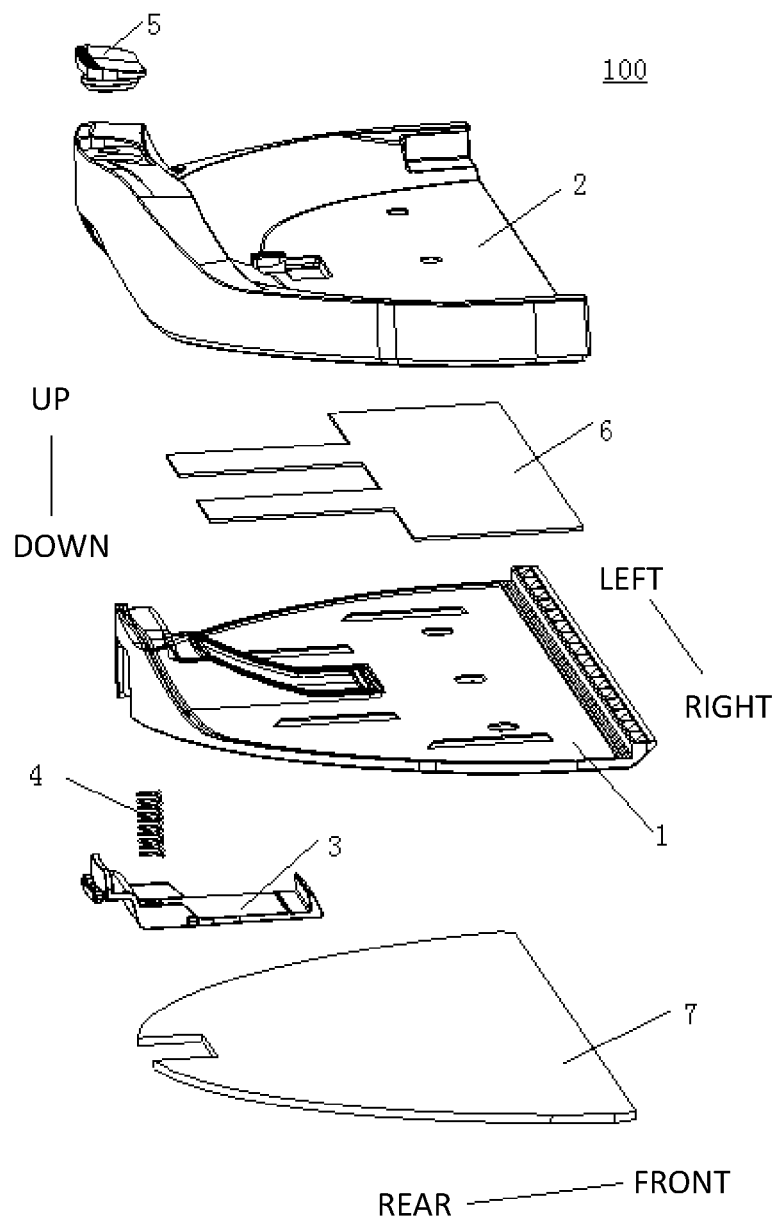
FIG. 1 is an exploded view of a water tank for a sweeper according to an embodiment of the present disclosure.

REFERENCE NUMERALS water tank 100 for sweeper, water tank lower cover 1, containing groove 11, pivot hole 12, first via hole 13, second positioning part 14, water outlet hole 15, limitation protruding rib 16, water tank upper cover 2, second via hole 21, locking part 22, first positioning guide groove 23, second positioning guide groove 24, bump 25, water-filling hole 26, water tank release button 3, pivot shaft 31, snap-fitting part 32, first positioning part 33, reset member 4, water-filling plug 5, purification slow flow member 6, mop fabric 7, sweeper 200, machine body 210, snap-fitting slot 211, locking position 212, first positioning block 213, second positioning block 214.

DETAILED DESCRIPTION OF THE DISCLOSURE

Embodiments of the present disclosure will be described in detail and examples of the embodiments will be illustrated in the drawings, where same or similar reference numerals are used to indicate same or similar members or members with same or similar functions. The embodiments described herein with reference to the accompanying drawings are explanatory, which are used to illustrate the present disclosure, but shall not be construed to limit the present disclosure.

A water tank 100 for a sweeper according to embodiments of the present disclosure is described below with reference to the accompanying drawings.

Figure 11:
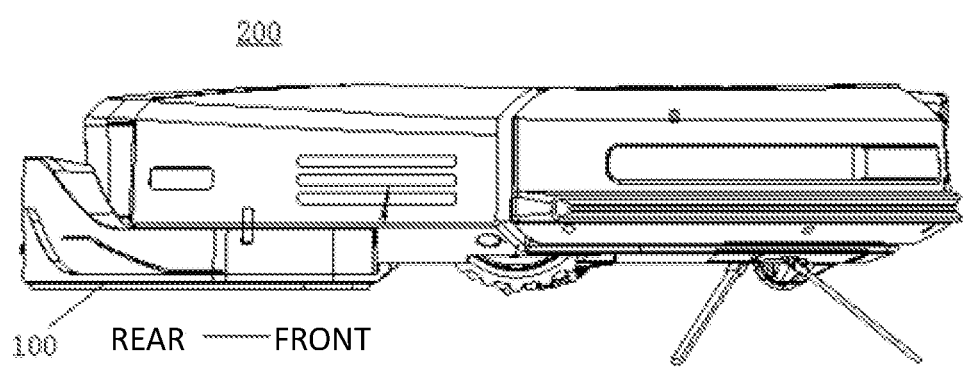
FIG. 11 is a schematic view of a sweeper according to an embodiment of the present disclosure, in which a machine body is provided with a water tank.

In the water tank 100 for the sweeper according to embodiments of a first aspect of the present disclosure, the water tank 100 is configured to be pulled in and out at a rear side of a machine body 210 of a sweeper 200 (referring to FIG. 11). For example, when the water tank 100 is assembled to the machine body 210, the water tank 100 may be assembled to the machine body 210 from rear to front; when the water tank 100 is detached from the machine body 210, the water tank 100 may be detached from the machine body 210 from front to rear.

Referring to FIG. 1, the water tank 100 includes a water tank lower cover 1, a water tank upper cover 2, a water tank release button 3 and a reset member 4.

Figure 2:
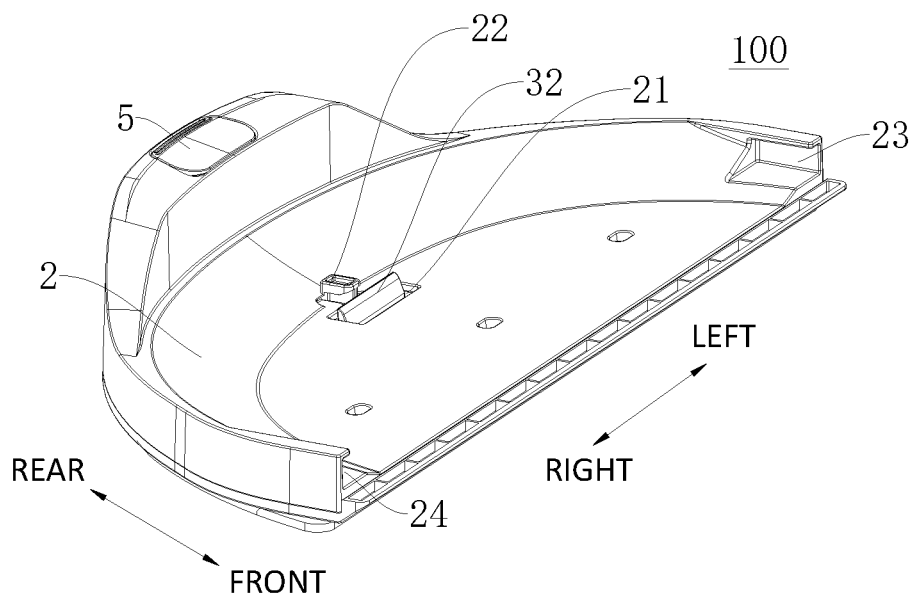
FIG. 2 is a perspective view of a water tank for a sweeper according to an embodiment of the present disclosure.
Figure 3:
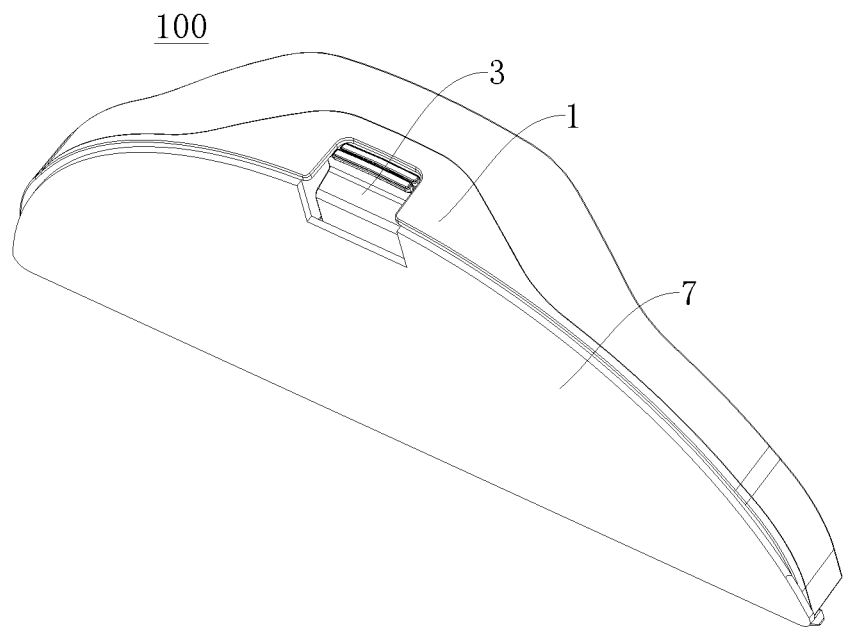
FIG. 3 is another perspective view of a water tank for a sweeper according to an embodiment of the present disclosure.
Figure 7:
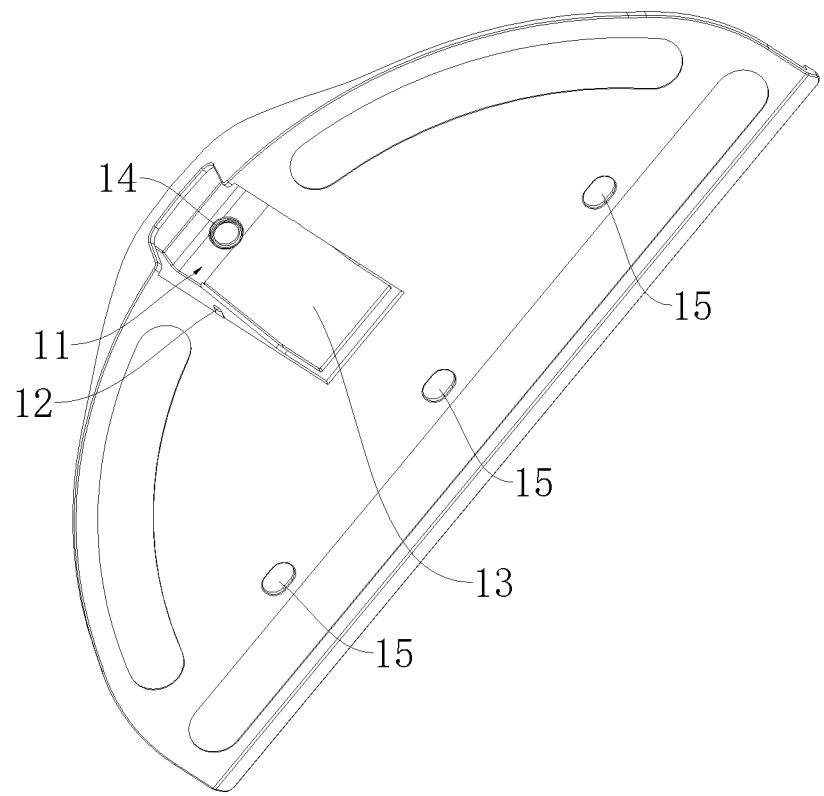
FIG. 7 is another perspective view of a water tank lower cover in a water tank for a sweeper according to an embodiment of the present disclosure.

In one embodiment, in combination with FIGS. 2 and 3, a bottom of the water tank lower cover 1 defines a containing groove 11 (referring to FIG. 7). The water tank upper cover 2 is coupled to the water tank lower cover 1 and a water storage chamber is defined between the water tank upper cover 2 and the water tank lower cover 1. The water storage chamber may store a predetermined amount of water. The water tank release button 3 is provided at the containing groove 11 (referring to FIG. 3), and the water tank release button 3 is configured to disengage the water tank 100 from the machine body 210 when the water tank release button 3 is triggered. For example, the water tank release button 3 is configured to be switchable between a first position and a second position. In the first position, the water tank 100 is coupled to the machine body 210, and in the second position, the water tank 100 is disengaged from the machine body 210.

As illustrated in FIG. 1, the reset member 4 has a first end coupled to the water tank release button 3 and a second end coupled to the water tank lower cover 1. For example, an upper end of the reset member 4 may be coupled to the water tank release button 3, and a lower end of the reset member 4 may be coupled to the water tank lower cover 1. When the water tank release button 3 is released, the resetting of the water tank release button 3 can be realized under the action of the reset member 4. Thus, the water tank 100 is configured to be pulled in and out at the rear side of the machine body 210 of the sweeper 200, assembly and detachment of the water tank 100 and the machine body 210 can be easily realized, and the machine body 210 does not need to be turned over for assembly and detachment, facilitating water filling. Additionally, separation of the water tank 100 from the machine body 210 can be realized by triggering the water tank release button 3 with one hand and drawing rearwards, greatly simplifying the process of detachment of the water tank 100 from the machine body 210.

In the water tank 100 for the sweeper according to embodiments of the present disclosure, the water tank 100 is configured to be pulled in and out at the rear side of the machine body 210 of the sweeper 200, assembly and detachment of the water tank 100 and the machine body 210 can be easily realized, and the machine body 210 does not need to be turned over for assembly and detachment, facilitating water filling; additionally, separation of the water tank 100 from the machine body 210 can be realized by triggering the water tank release button 3 with one hand and drawing rearwards, greatly simplifying the process of detachment of the water tank 100 from the machine body 210.

Referring to FIG. 1 in combination with FIG. 3, according to some embodiments of the present disclosure, the water tank release button 3 is pivotally provided at the containing groove 11. For example, the water tank release button 3 is provided at the containing groove 11, and the water tank release button 3 is rotatable at the containing groove 11 and a user can operate the water tank release button 3 with one hand more conveniently, and the operation is more labor-saving.

Further, one of the water tank release button 3 and the water tank lower cover 1 is provided with a pivot shaft 31 and the other defines a pivot hole 12, and the pivot shaft 31 is mated with the pivot hole 12. For example, in some examples of the present disclosure, it may be that the water tank release button 3 is provided with the pivot shaft 31, and the water tank lower cover 1 defines the pivot hole 12, and the pivot shaft 31 is mated with the pivot hole 12. In some examples of the present disclosure, it may also be that the water tank lower cover 1 is provided with the pivot shaft 31, and the water tank release button 3 defines the pivot hole 12, and the pivot shaft 31 is mated with the pivot hole 12. Thus, by fitting the pivot shaft 31 with the pivot hole 12, pivoting of the water tank release button 3 is easy to realize, and the user's operation is facilitated.

Figure 6:
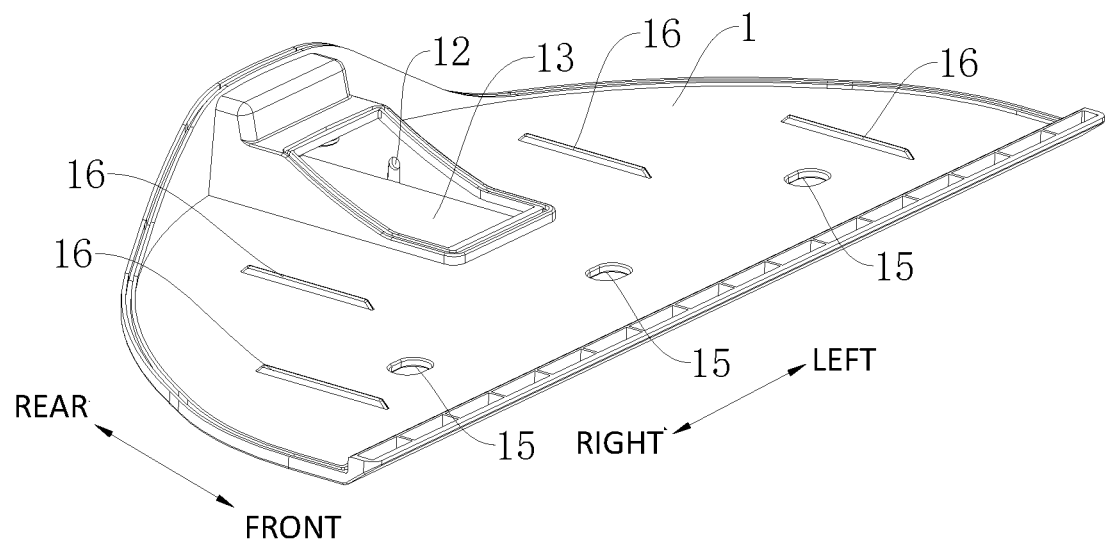
FIG. 6 is a perspective view of a water tank lower cover in a water tank for a sweeper according to an embodiment of the present disclosure.
Figure 8:
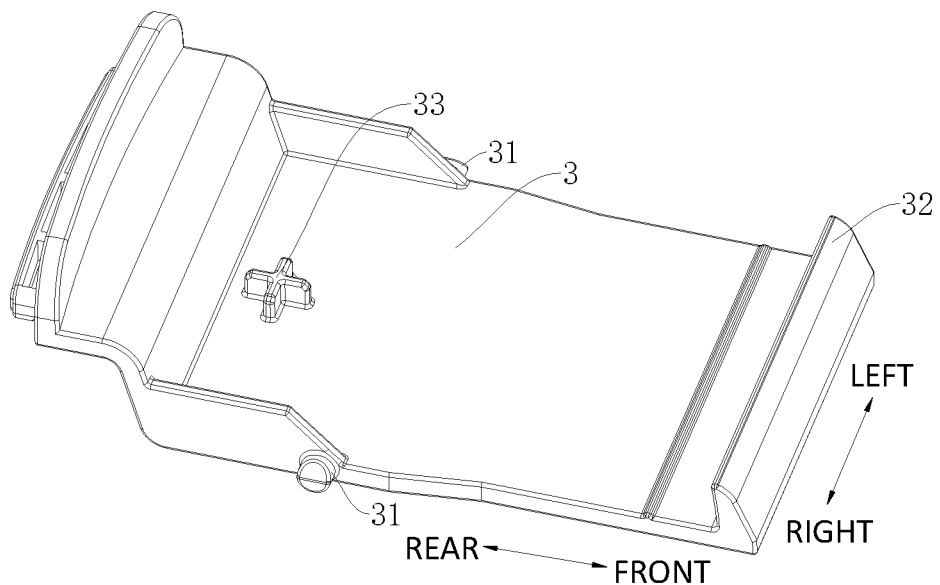
FIG. 8 is a perspective view of a water tank release button in a water tank for a sweeper according to an embodiment of the present disclosure.

For example, FIG. 8 illustrates that the water tank release button 3 is provided with the pivot shaft 31, and FIGS. 6 and 7 illustrate that the water tank lower cover 1 is provided with the pivot hole 12. In one embodiment, two pivot shafts 31 are provided, and the two pivot shafts 31 are symmetrically arranged at left and right opposite sides of the water tank release button 3; two pivot holes 12 are provided, and the two pivot holes 12 are symmetrically arranged in left and right opposite side walls of the containing groove 11.

In one embodiment, a free end of the water tank release button 3 forms a snap-fitting part 32 protruded upwards (referring to FIG. 8), the water tank lower cover 1 defines a first via hole 13 in communication with the containing groove 11 (referring to FIGS. 6 and 7), the water tank upper cover 2 defines a second via hole 21 corresponding to the first via hole 13 (referring to FIGS. 4 and 5), the snap-fitting part 32 passes through the first via hole 13 and the second via hole 21 (referring to FIG. 2) and protrudes from an upper surface of the water tank upper cover 2; the machine body 210 defines a snap-fitting slot 211 mating with the snap-fitting part 32.

For example, an end of the water tank release button 3 close to the machine body 210 (referring to FIG. 8, a front end of the water tank release button 3) may form the snap-fitting part 32, and the snap-fitting part 32 may protrude upwards. The water tank lower cover 1 defines the first via hole 13, and the first via hole 13 may be in communication with the containing groove 11. The water tank upper cover 2 defines a second via hole 21, and the second via hole 21 is partially opposite the first via hole 13 in an up-and-down direction. The snap-fitting part 32 passes through the first via hole 13 and the second via hole 21, and the snap-fitting part 32 may protrude from the upper surface of the water tank upper cover 2. The snap-fitting part 32 may pass through the first via hole 13 and the second via hole 21 sequentially from bottom to top, and a top of the snap-fitting part 32 may protrude upwards from the second via hole 21.

Figure 9:
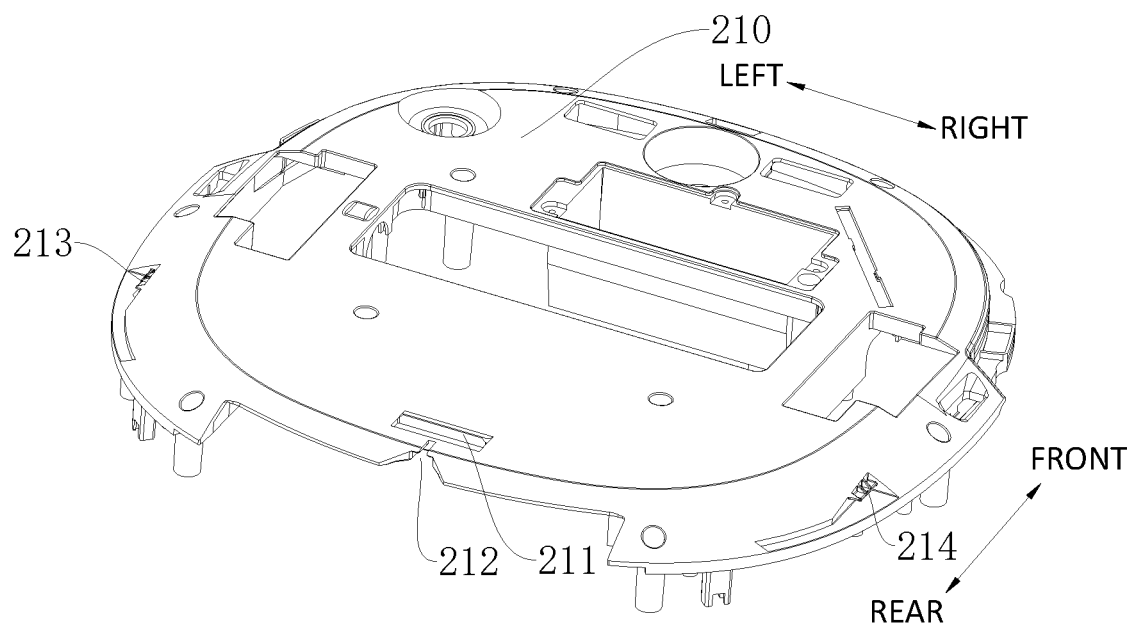
FIG. 9 is a perspective view of a machine body of a sweeper according to an embodiment of the present disclosure.
Figure 10:
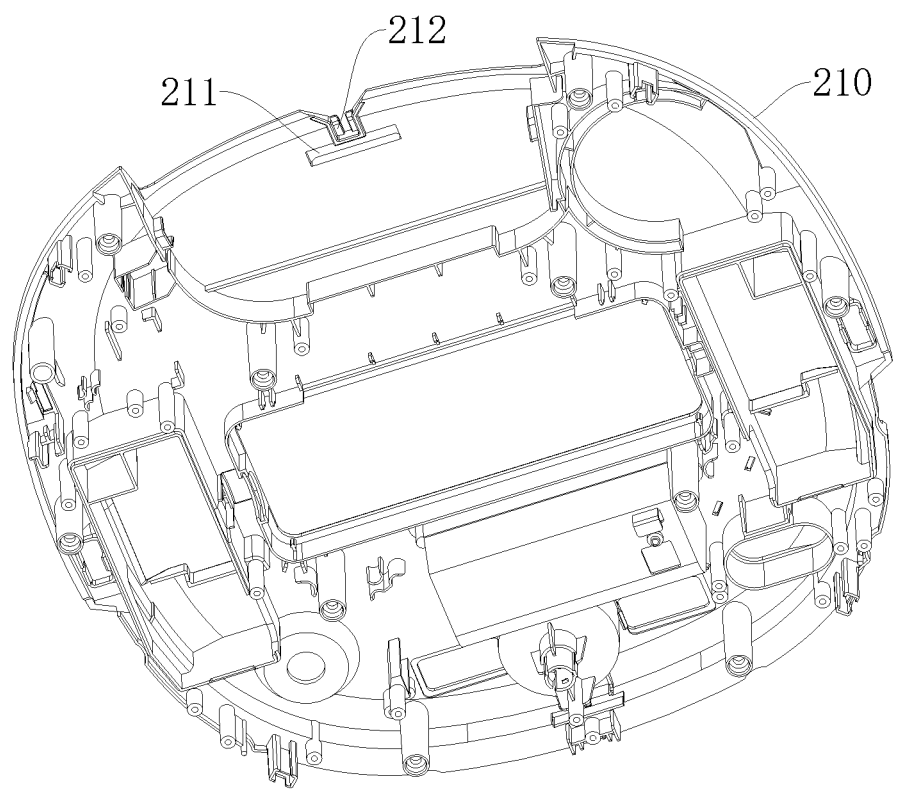
FIG. 10 is another perspective view of a machine body of a sweeper according to an embodiment of the present disclosure.

Referring to FIGS. 9 and 10, the machine body 210 defines the snap-fitting slot 211, and the snap-fitting slot 211 is mated with the snap-fitting part 32. The snap-fitting slot 211 may be defined in a middle of a rear end of the machine body 210, and the snap-fitting slot 211 and the snap-fitting part 32 may be switchable between an engaged position and a disengaged position. When the water tank 100 is mounted on the machine body 210, the snap-fitting slot 211 and the snap-fitting part 32 are in the engaged position; and when the water tank release button 3 is triggered and the water tank 100 is detached from the machine body 210, the snap-fitting slot 211 and the snap-fitting part 32 are in the disengaged position.

Figure 4:
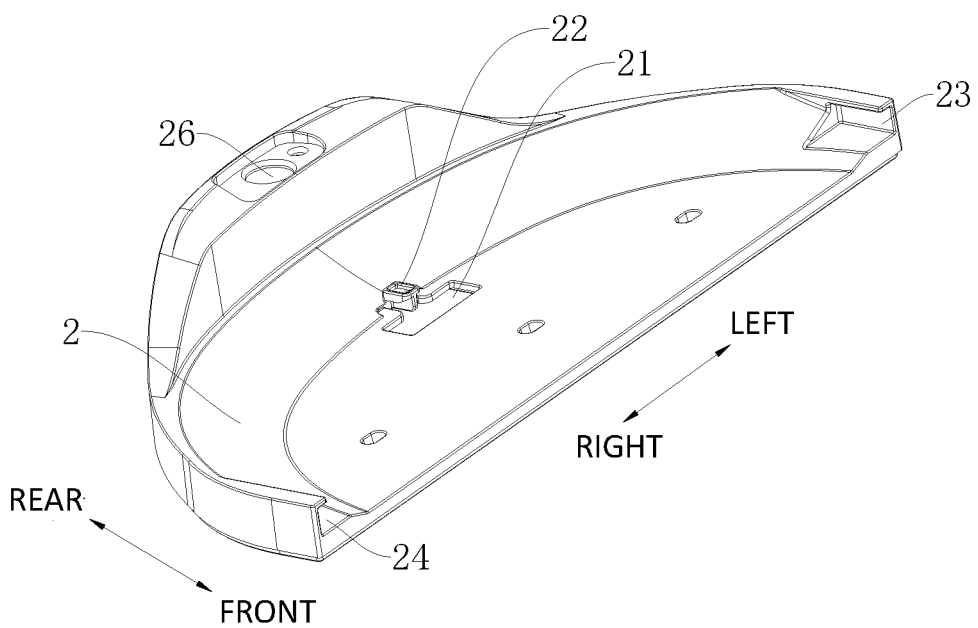
FIG. 4 is a perspective view of a water tank upper cover in a water tank for a sweeper according to an embodiment of the present disclosure.
Figure 5:
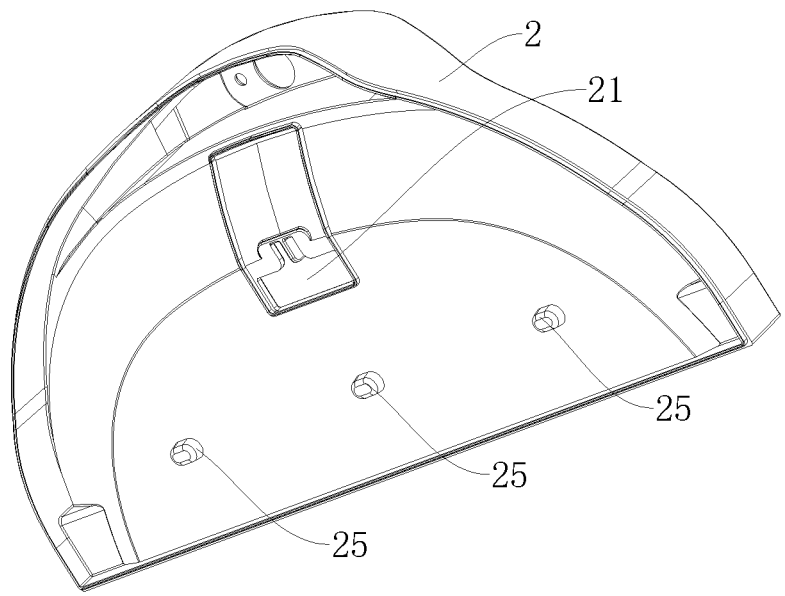
FIG. 5 is another perspective view of a water tank upper cover in a water tank for a sweeper according to an embodiment of the present disclosure.

Further, referring to FIG. 4, the water tank upper cover 2 is provided with a locking part 22, a first positioning guide groove 23 and a second positioning guide groove 24. The locking part 22 is located at a rear side of the second via hole 21 and adjacent to the second via hole 21. The first positioning guide groove 23 and the second positioning guide groove 24 are defined in left and right opposite sides of the water tank upper cover 2. For example, the locking part 22 may be located at a middle of the rear side of the second via hole 21, and the locking part 22 may be provided adjacent to the second via hole 21. The first positioning guide groove 23 and the second positioning guide groove 24 may be provided in left and right opposite sides of the water tank upper cover 2.

In combination with FIGS. 9 and 10, the machine body 210 is provided with a locking position 212, a first positioning block 213 and a second positioning block 214. The locking position 212 is provided at a rear side of the snap-fitting slot 211 and is mated with the locking part 22, the first positioning block 213 is fitted with the first positioning guide groove 23, and the second positioning block 214 is fitted with the second positioning guide groove 24. For example, the locking position 212 may be provided at a middle of the rear side of the snap-fitting slot 211, and the locking position 212 may be mated with the locking part 22. The first positioning block 213 is fitted with the first positioning guide groove 23, and the second positioning block 214 is fitted with the second positioning guide groove 24.

In the water tank 100 for the sweeper according to embodiments of the present disclosure, when the water tank 100 is assembled to the machine body 210, the first positioning guide groove 23 is fitted with the first positioning block 213, the second positioning guide groove 24 is fitted with the second positioning block 214, the snap-fitting part 32 is engaged in the snap-fitting slot 211, and the locking part 22 is fitted at the locking position 212. When the water tank 100 is detached from the machine body 210, the water tank release button 3 is triggered (e.g., upwards, etc.) to disengage the snap-fitting part 32 from the snap-fitting slot 211, and the tank body 210 is drawn rearwards to disengage the first positioning guide groove 23 from the first positioning block 213, disengage the second positioning guide groove 24 from the second positioning block 214, and disengage the locking part 22 from the locking position 212.

According to some embodiments of the present disclosure, referring to FIGS. 7 and 8, an inner bottom wall of the water tank release button 3 forms a first positioning part 33, and a bottom of the water tank lower cover 1 forms a second positioning part 14 corresponding to the first positioning part 33. The reset member 4 has the first end coupled to the first positioning part 33 and the second end coupled to the second positioning part 14. For example, the first positioning part 33 and the second positioning part 14 may be oppositely arranged in the up-and-down direction, the lower end of the reset member 4 may be coupled to the first positioning part 33, and the upper end of the reset member 4 may be coupled to the second positioning part 14.

Further, in some examples of the present disclosure, the first positioning part 33 may be a cross-shaped protruding rib, and the second positioning part 14 may be a positioning sleeve. The positioning sleeve may be provided at an outer bottom wall of the water tank lower cover 1 and extend downwards. The reset member 4 may be a reset spring, the lower end of the reset member 4 may be fitted over an outside of the cross-shaped protruding rib and abut against an inner bottom face of the water tank release button 3 (e.g., an upper surface), and the upper end of the reset member 4 may be inserted inside the positioning sleeve and abut against an inner bottom face of the positioning sleeve (e.g. the outer bottom wall of the water tank lower cover 1).

In one embodiment, the bottom wall of the water tank upper cover 2 forms a sunken bump 25 (referring to FIGS. 4 and 5), the water tank lower cover 1 defines a water outlet hole 15 in communication with the water storage chamber (referring to FIGS. 6 and 7), and the bump 25 is in clearance fit with the water outlet hole 15. For example, the bump 25 may be formed by sinking the bottom wall of the water tank upper cover 2 downwards, the bump 25 protrudes downwards from the outer bottom wall of the water tank upper cover 2, and the bump 25 may be provided at a middle or a front of the water tank upper cover 2 in a front-and-rear direction. The water tank lower cover 1 defines the water outlet hole 15, and the water outlet hole 15 may be communicated with the water storage chamber. The bump 25 is adapted to fit in the water outlet hole 15, and a size of the water outlet hole 15 may be slightly greater than a size of the bump 25, and a predetermined clearance is defined between an outer side wall of the bump 25 and an inner side wall of the water outlet hole 15, and the water in the water storage chamber may flow out via the predetermined clearance.

Exemplarily and without limitation, a projection of the bump 25 on the bottom wall of the water tank upper cover 2 may have an oblong shape, and correspondingly, a projection of the water outlet hole 15 on the water tank lower cover 1 may also have an oblong shape. The oblong shape may be defined as a shape formed by selecting two points of the circle located in the same diameter or two arc segments of the circle symmetrical with respect to the center of the circle and stretching the circle along a straight line or arc.

In some specific embodiments of the present disclosure, the water tank upper cover 2 forms three bumps 25, and the three bumps 25 may be arranged to be evenly or unevenly spaced apart in a left-and-right direction of the water tank upper cover 2. The water tank lower cover 1 defines three water outlet holes 15, and the three water outlet holes 15 may be arranged to be evenly or unevenly spaced apart in the left-and-right direction of the water tank lower cover 1. Thus, it helps to disperse the water and facilitate the cleaning.

In some embodiments of the present disclosure, the bump 25 and the water outlet hole 15 may also be configured to have other shapes such as a circle, an ellipse, etc. The present disclosure does not specifically limit the shapes, numbers and sizes of the bump 25 and the water outlet hole 15, which can be adaptively set according to requirements in practical applications.

Further, referring to FIGS. 1, 2 and 4, the water tank 100 further includes a water-filling plug 5, the water tank upper cover 2 defines a water-filling hole 26, and the water-filling plug 5 is detachably provided at the water-filling hole 26. When the water-filling plug 5 is opened, the water can be filled in the water tank (e.g., the water storage chamber) through the water-filling hole 26; when the water-filling is completed, the water-filling hole 26 may be blocked off by the water-filling plug 5.

Furthermore, referring to FIGS. 1 and 6, the water tank 100 also includes a purification slow flow member 6, and the purification slow flow member 6 is provided at the inner bottom wall of the water tank lower cover 1. Thus, the purification slow flow member 6 can not only filter and purify the water in the water storage chamber, but also facilitate reduction in the flow speed of the water, improving the cleaning effect.

In some embodiments of the present disclosure, the purification slow flow member 6 may be filter cotton. In some embodiments of the present disclosure, the purification slow flow member 6 may also be other structural forms.

In one embodiment, the inner bottom wall of the water tank lower cover 1 forms a limitation protruding rib 16 to limit the purification slow flow member 6. Thus, the purification slow flow member 6 can be limited by the limitation protruding rib 16 to limit movement of the purification slow flow member 6 on the water tank lower cover 1.

For example, one or more groups of limitation protruding ribs 16 may be included (in the description of the present disclosure, the meaning of "plurality of" is two or more). FIG. 6 illustrates two groups of limitation protruding ribs 16, the limitation protruding ribs 16 may extend in the front-and-rear direction, the two limitation protruding ribs 16 located at the rear side of the water tank lower cover 1 may be one group of limitation protruding ribs, the two limitation protruding ribs 16 located at the front side of the water tank lower cover 1 may be one group of limitation protruding ribs, and the two groups of limitation protruding ribs can limit movement of the purification slow flow member 6 in the left-and-right direction.

Further, referring to FIGS. 1 and 3, the water tank 100 further includes a mop fabric 7, and the mop fabric 7 is provided at an outer side of the bottom wall of the water tank lower cover 1. In one embodiment, the mop fabric 7 and the water tank lower cover 1 may be bound together. For example, the mop fabric 7 and the water tank lower cover 1 may be bound together by a hook and loop tape. Thus, this facilitates realization of mounting and detachment of the mop fabric 7 on the water tank lower cover 1.

In some embodiments, the mop fabric 7 and the water tank lower cover 1 may also be coupled by a snap fit, etc.

According to some embodiments of the present disclosure, the water tank upper cover 2 and the water tank lower cover 1 may be coupled by ultrasonic welding. Thus, this can realize reliable coupling between the water tank upper cover 2 and the water tank lower cover 1, and can ensure sealing of the coupling.

A specific embodiment of a water tank 100 for a sweeper according to the present disclosure is described below with reference to the accompanying drawings.

In the water tank 100 for the sweeper according to embodiments of the present disclosure, the water tank 100 is configured to be pulled in and out at a rear side of a machine body 210 of a sweeper 200. For example, when the water tank 100 is assembled to the machine body 210, the water tank 100 may be assembled to the machine body 210 from rear to front; when the water tank 100 is detached from the machine body 210, the water tank 100 may be detached from the machine body 210 from front to rear.

Referring to FIG. 1, the water tank 100 includes a water tank lower cover 1, a water tank upper cover 2, a water tank release button 3 and a reset member 4.

In one embodiment, in combination with FIGS. 2 and 3, a bottom of the water tank lower cover 1 defines a containing groove 11 (referring to FIG. 7). The water tank upper cover 2 is coupled to the water tank lower cover 1 and a water storage chamber is defined between the water tank upper cover 2 and the water tank lower cover 1. The water storage chamber may store a predetermined amount of water. The water tank release button 3 is provided at the containing groove 11 (referring to FIG. 3), and the water tank release button 3 is configured to disengage the water tank 100 from the machine body 210 when the water tank release button 3 is triggered. For example, the water tank release button 3 is configured to be switchable between a first position and a second position. In the first position, the water tank 100 is coupled to the machine body 210, and in the second position, the water tank 100 is disengaged from the machine body 210.

As illustrated in FIG. 1, the reset member 4 has a first end coupled to the water tank release button 3 and a second end coupled to the water tank lower cover 1. For example, an upper end of the reset member 4 may be coupled to the water tank release button 3, and a lower end of the reset member 4 may be coupled to the water tank lower cover 1. When the water tank release button 3 is released, the resetting of the water tank release button 3 can be realized under the action of the reset member 4. Thus, the water tank 100 is configured to be pulled in and out at the rear side of the machine body 210 of the sweeper 200, assembly and detachment of the water tank 100 and the machine body 210 can be easily realized, and the machine body 210 does not need to be turned over for assembly and detachment, facilitating water filling. Additionally, separation of the water tank 100 from the machine body 210 can be realized by triggering the water tank release button 3 with one hand and drawing rearwards, greatly simplifying the process of detachment of the water tank 100 from the machine body 210.

In the water tank 100 for the sweeper according to embodiments of the present disclosure, the water tank 100 is configured to be pulled in and out at the rear side of the machine body 210 of the sweeper 200, assembly and detachment of the water tank 100 and the machine body 210 can be easily realized, and the machine body 210 does not need to be turned over for assembly and detachment, facilitating water filling; additionally, separation of the water tank 100 from the machine body 210 can be realized by triggering the water tank release button 3 with one hand and drawing rearwards, greatly simplifying the process of detachment of the water tank 100 from the machine body 210.

Referring to FIG. 1 in combination with FIG. 3, according to some embodiments of the present disclosure, the water tank release button 3 is pivotally provided at the containing groove 11. For example, the water tank release button 3 is provided at the containing groove 11, and the water tank release button 3 is rotatable at the containing groove 11 and a user can operate the water tank release button 3 with one hand more conveniently, and the operation is more labor-saving.

Further, one of the water tank release button 3 and the water tank lower cover 1 is provided with a pivot shaft 31 and the other defines a pivot hole 12, and the pivot shaft 31 is mated with the pivot hole 12. For example, in some examples of the present disclosure, it may be that the water tank release button 3 is provided with the pivot shaft 31, and the water tank lower cover 1 defines the pivot hole 12, and the pivot shaft 31 is mated with the pivot hole 12. In some examples of the present disclosure, it may also be that the water tank lower cover 1 is provided with the pivot shaft 31, and the water tank release button 3 defines the pivot hole 12, and the pivot shaft 31 is mated with the pivot hole 12. Thus, by fitting the pivot shaft 31 with the pivot hole 12, pivoting of the water tank release button 3 is easy to realize, and the user's operation is facilitated.

For example, FIG. 8 illustrates that the water tank release button 3 is provided with the pivot shaft 31, and FIGS. 6 and 7 illustrate that the water tank lower cover 1 is provided with the pivot hole 12. In one embodiment, two pivot shafts 31 are provided, and the two pivot shafts 31 are symmetrically arranged at left and right opposite sides of the water tank release button 3; two pivot holes 12 are provided, and the two pivot holes 12 are symmetrically arranged in left and right opposite side walls of the containing groove 11.

In one embodiment, a free end of the water tank release button 3 forms a snap-fitting part 32 protruded upwards (referring to FIG. 8), the water tank lower cover 1 defines a first via hole 13 in communication with the containing groove 11 (referring to FIGS. 6 and 7), the water tank upper cover 2 defines a second via hole 21 corresponding to the first via hole 13 (referring to FIGS. 4 and 5), the snap-fitting part 32 passes through the first via hole 13 and the second via hole 21 (referring to FIG. 2) and protrudes from an upper surface of the water tank upper cover 2; the machine body 210 defines a snap-fitting slot 211 mating with the snap-fitting part 32.

For example, an end of the water tank release button 3 close to the machine body 210 (referring to FIG. 8, a front end of the water tank release button 3) may form the snap-fitting part 32, and the snap-fitting part 32 may protrude upwards. The water tank lower cover 1 defines the first via hole 13, and the first via hole 13 may be in communication with the containing groove 11. The water tank upper cover 2 defines a second via hole 21, and the second via hole 21 is partially opposite the first via hole 13 in an up-and-down direction. The snap-fitting part 32 passes through the first via hole 13 and the second via hole 21, and the snap-fitting part 32 may protrude from the upper surface of the water tank upper cover 2. The snap-fitting part 32 may pass through the first via hole 13 and the second via hole 21 sequentially from bottom to top, and a top of the snap-fitting part 32 may protrude upwards from the second via hole 21.

Referring to FIGS. 9 and 10, the machine body 210 defines the snap-fitting slot 211, and the snap-fitting slot 211 is mated with the snap-fitting part 32. The snap-fitting slot 211 may be defined in a middle of a rear end of the machine body 210, and the snap-fitting slot 211 and the snap-fitting part 32 may be switchable between an engaged position and a disengaged position. When the water tank 100 is mounted on the machine body 210, the snap-fitting slot 211 and the snap-fitting part 32 are in the engaged position; and when the water tank release button 3 is triggered and the water tank 100 is detached from the machine body 210, the snap-fitting slot 211 and the snap-fitting part 32 are in the disengaged position.

Further, referring to FIG. 4, the water tank upper cover 2 is provided with a locking part 22, a first positioning guide groove 23 and a second positioning guide groove 24. The locking part 22 is located at a rear side of the second via hole 21 and adjacent to the second via hole 21. The first positioning guide groove 23 and the second positioning guide groove 24 are defined in left and right opposite sides of the water tank upper cover 2. For example, the locking part 22 may be located at a middle of the rear side of the second via hole 21, and the locking part 22 may be provided adjacent to the second via hole 21. The first positioning guide groove 23 and the second positioning guide groove 24 may be provided in left and right opposite sides of the water tank upper cover 2.

In combination with FIGS. 9 and 10, the machine body 210 is provided with a locking position 212, a first positioning block 213 and a second positioning block 214. The locking position 212 is provided at a rear side of the snap-fitting slot 211 and is mated with the locking part 22, the first positioning block 213 is fitted with the first positioning guide groove 23, and the second positioning block 214 is fitted with the second positioning guide groove 24. For example, the locking position 212 may be provided at a middle of the rear side of the snap-fitting slot 211, and the locking position 212 may be mated with the locking part 22. The first positioning block 213 is fitted with the first positioning guide groove 23, and the second positioning block 214 is fitted with the second positioning guide groove 24.

In the water tank 100 for the sweeper according to embodiments of the present disclosure, when the water tank 100 is assembled to the machine body 210, the first positioning guide groove 23 is fitted with the first positioning block 213, the second positioning guide groove 24 is fitted with the second positioning block 214, the snap-fitting part 32 is engaged in the snap-fitting slot 211, and the locking part 22 is fitted at the locking position 212. When the water tank 100 is detached from the machine body 210, the water tank release button 3 is triggered (e.g., upwards, etc.) to disengage the snap-fitting part 32 from the snap-fitting slot 211, and the tank body 210 is drawn rearwards to disengage the first positioning guide groove 23 from the first positioning block 213, disengage the second positioning guide groove 24 from the second positioning block 214, and disengage the locking part 22 from the locking position 212.

According to some embodiments of the present disclosure, referring to FIGS. 7 and 8, an inner bottom wall of the water tank release button 3 forms a first positioning part 33, and a bottom of the water tank lower cover 1 forms a second positioning part 14 corresponding to the first positioning part 33. The reset member 4 has the first end coupled to the first positioning part 33 and the second end coupled to the second positioning part 14. For example, the first positioning part 33 and the second positioning part 14 may be oppositely arranged in the up-and-down direction, the lower end of the reset member 4 may be coupled to the first positioning part 33, and the upper end of the reset member 4 may be coupled to the second positioning part 14.

Further, in some examples of the present disclosure, the first positioning part 33 may be a cross-shaped protruding rib, and the second positioning part 14 may be a positioning sleeve. The positioning sleeve may be provided at an outer bottom wall of the water tank lower cover 1 and extend downwards. The reset member 4 may be a reset spring, the lower end of the reset member 4 may be fitted over an outside of the cross-shaped protruding rib and abut against an inner bottom face of the water tank release button 3 (e.g., an upper surface), and the upper end of the reset member 4 may be inserted inside the positioning sleeve and abut against an inner bottom face of the positioning sleeve (e.g. the outer bottom wall of the water tank lower cover 1).

In one embodiment, the bottom wall of the water tank upper cover 2 forms a sunken bump 25 (referring to FIGS. 4 and 5), the water tank lower cover 1 defines a water outlet hole 15 in communication with the water storage chamber (referring to FIGS. 6 and 7), and the bump 25 is in clearance fit with the water outlet hole 15. For example, the bump 25 may be formed by sinking the bottom wall of the water tank upper cover 2 downwards, the bump 25 protrudes downwards from the outer bottom wall of the water tank upper cover 2, and the bump 25 may be provided at a middle or a front of the water tank upper cover 2 in a front-and-rear direction. The water tank lower cover 1 defines the water outlet hole 15, and the water outlet hole 15 may be communicated with the water storage chamber. The bump 25 is adapted to fit in the water outlet hole 15, and a size of the water outlet hole 15 may be slightly greater than a size of the bump 25, and a predetermined clearance is defined between an outer side wall of the bump 25 and an inner side wall of the water outlet hole 15, and the water in the water storage chamber may flow out via the predetermined clearance.

Exemplarily and without limitation, a projection of the bump 25 on the bottom wall of the water tank upper cover 2 may have an oblong shape, and correspondingly, a projection of the water outlet hole 15 on the water tank lower cover 1 may also have an oblong shape. The oblong shape may be defined as a shape formed by selecting two points of the circle located in the same diameter or two arc segments of the circle symmetrical with respect to the center of the circle and stretching the circle along a straight line or arc.

In some specific embodiments of the present disclosure, the water tank upper cover 2 forms three bumps 25, and the three bumps 25 may be arranged to be evenly or unevenly spaced apart in a left-and-right direction of the water tank upper cover 2. The water tank lower cover 1 defines three water outlet holes 15, and the three water outlet holes 15 may be arranged to be evenly or unevenly spaced apart in the left-and-right direction of the water tank lower cover 1. Thus, it helps to disperse the water and facilitate the cleaning.

In some embodiments of the present disclosure, the bump 25 and the water outlet hole 15 may also be configured to have other shapes such as a circle, an ellipse, etc. The present disclosure does not specifically limit the shapes, numbers and sizes of the bump 25 and the water outlet hole 15, which can be adaptively set according to requirements in practical applications.

Further, referring to FIGS. 1, 2 and 4, the water tank 100 further includes a water-filling plug 5, the water tank upper cover 2 defines a water-filling hole 26, and the water-filling plug 5 is detachably provided at the water-filling hole 26. When the water-filling plug 5 is opened, the water can be filled in the water tank (e.g., the water storage chamber) through the water-filling hole 26; when the water-filling is completed, the water-filling hole 26 may be blocked off by the water-filling plug 5.

Furthermore, referring to FIGS. 1 and 6, the water tank 100 also includes a purification slow flow member 6, and the purification slow flow member 6 is provided at the inner bottom wall of the water tank lower cover 1. Thus, the purification slow flow member 6 can not only filter and purify the water in the water storage chamber, but also facilitate reduction in the flow speed of the water, improving the cleaning effect.

In some embodiments of the present disclosure, the purification slow flow member 6 may be filter cotton. In some embodiments of the present disclosure, the purification slow flow member 6 may also be other structural forms.

In one embodiment, the inner bottom wall of the water tank lower cover 1 forms a limitation protruding rib 16 to limit the purification slow flow member 6. Thus, the purification slow flow member 6 can be limited by the limitation protruding rib 16 to limit movement of the purification slow flow member 6 on the water tank lower cover 1.

For example, one or more groups of limitation protruding ribs 16 may be included. FIG. 6 illustrates two groups of limitation protruding ribs 16, the limitation protruding ribs 16 may extend in the front-and-rear direction, the two limitation protruding ribs 16 located at the rear side of the water tank lower cover 1 may be one group of limitation protruding ribs, the two limitation protruding ribs 16 located at the front side of the water tank lower cover 1 may be one group of limitation protruding ribs, and the two groups of limitation protruding ribs can limit movement of the purification slow flow member 6 in the left-and-right direction.

In the description of the present disclosure, the meaning of "plurality of" is two or more.

Further, referring to FIGS. 1 and 3, the water tank 100 further includes a mop fabric 7, and the mop fabric 7 is provided at an outer side of the bottom wall of the water tank lower cover 1. In one embodiment, the mop fabric 7 and the water tank lower cover 1 may be bound together. For example, the mop fabric 7 and the water tank lower cover 1 may be bound together by a hook and loop tape. Thus, this facilitates realization of mounting and detachment of the mop fabric 7 on the water tank lower cover 1.

In some embodiments, the mop fabric 7 and the water tank lower cover 1 may also be coupled by a snap fit, etc.

According to some embodiments of the present disclosure, the water tank upper cover 2 and the water tank lower cover 1 may be coupled by ultrasonic welding. Thus, this can realize reliable coupling between the water tank upper cover 2 and the water tank lower cover 1, and can ensure sealing of the coupling.

Referring to FIG. 11, a sweeper 200 according to embodiments of a second aspect of the present disclosure includes a water tank 100 for a sweeper described above. Thus, by providing the sweeper 200 with the water tank 100 according to embodiments of the first aspect, mounting and detachment of the water tank 100 and the machine body 210 can be conveniently realized, and the operation is easy and fast.

In the sweeper 200 according to embodiments of the second aspect of the present disclosure, when the water tank 100 is detached from the machine body 210, the water tank release button 3 is triggered upwards with one hand, and the water tank 100 is drawn rearwards to realize the separation of the water tank 100 and the machine body 210; when the water tank 100 is mounted on the machine body 210, the water tank 100 is horizontally pushed towards the rear side of the machine body 210 from rear to front to realize the assembly of the water tank 100 and the machine body 210. The assembly and disassembly of the water tank 100 is convenient and reliable, the structure is simple and the costs are low.

Other compositions and operations such as sweeping and cleaning methods of the water tank 100 for the sweeper and the sweeper 200 according to embodiments of the present disclosure.

In the specification of the present disclosure, it is to be understood that terms such as "thickness," "upper," "lower," "front," "rear," "left," "right," "vertical," "horizontal," "top," "bottom," "inner," and "outer," should be construed to refer to the orientation as then described or as shown in the drawings under discussion. These relative terms are for convenience of description and do not require that the present disclosure be constructed or operated in a particular orientation, and thus cannot be construed as limitation to the present disclosure.

Reference throughout this specification to "an embodiment," "some embodiments," "schematic embodiments," "an example," "a specific example," or "some examples," means that a particular feature, structure, material, or characteristic described in connection with the embodiment or example is included in at least one embodiment or example of the present disclosure. Schematic representations of the above terms throughout this specification are not necessarily referring to the same embodiment or example. Furthermore, the particular features, structures, materials, or characteristics may be combined in any suitable manner in one or more embodiments or examples.

What is claimed is:

1. A water tank for a sweeper, the water tank configured to be pulled in and out at a rear side of a machine body of the sweeper, and the water tank comprising:
    a water tank lower cover, a bottom of the water tank lower cover defining a containing groove;
    a water tank upper cover coupled to the water tank lower cover, wherein the water tank upper cover and the water tank lower cover defines a water storage chamber;
    a water tank release button provided at the containing groove and configured to disengage the water tank from the machine body when the water tank release button is triggered; and
    a reset member having a first end coupled to the water tank release button and a second end coupled to the water tank lower cover;
    wherein an inner bottom wall of the water tank release button forms a first positioning part, the bottom of the water tank lower cover forms a second positioning part corresponding to the first positioning part, and the reset member has the first end coupled to the first positioning part and the second end coupled to the second positioning part.

2. The water tank according to claim 1, wherein the water tank release button is pivotally provided at the containing groove.

3. The water tank according to claim 2, wherein the water tank release button and the water tank lower cover is provided with a pivot shaft and the other defines a pivot hole, and the pivot shaft is mated with the pivot hole.

4. The water tank according to claim 2, wherein
a free end of the water tank release button forms a snap-fitting part protruded upwards, the water tank lower cover defines a first via hole in communication with the containing groove, the water tank upper cover defines a second via hole corresponding to the first via hole, the snap-fitting part passes through the first via hole and the second via hole and protrudes from an upper surface of the water tank upper cover; and
the machine body defines a snap-fitting slot mating with the snap-fitting part.

5. The water tank according to claim 4, wherein
the water tank upper cover is provided with a locking part, a first positioning guide groove and a second positioning guide groove, the locking part is located at a rear side of the second via hole and adjacent to the second via hole, the first positioning guide groove and the second positioning guide groove are defined in left and right opposite sides of the water tank upper cover; and
the machine body is provided with a locking position, a first positioning block and a second positioning block, the locking position is provided at a rear side of the snap-fitting slot and mated with the locking part, the first positioning block is fitted with the first positioning guide groove, and the second positioning block is fitted with the second positioning guide groove.

6. The water tank according to claim 1, wherein the first positioning part is a cross-shaped protruding rib, and the second positioning part is a positioning sleeve.

7. The water tank according to claim 6, wherein the positioning sleeve is provided at an outer bottom wall of the water tank lower cover and extends downwards.

8. The water tank according to claim 6, wherein the reset member is a reset spring, a lower end of the reset spring is fitted over an outside of the cross-shaped protruding rib and abuts against an inner bottom face of the water tank release button, and an upper end of the reset spring is inserted inside the positioning sleeve and abuts against an inner bottom face of the positioning sleeve.

9. The water tank according to claim 1, wherein a bottom wall of the water tank upper cover forms a sunken bump, the water tank lower cover defines a water outlet hole in communication with the water storage chamber, and the sunken bump is in clearance fit with the water outlet hole.

10. The water tank according to claim 9, wherein the sunken bump is formed by sinking the bottom wall of the water tank upper cover downwards, and the sunken bump protrudes downwards from an outer bottom wall of the water tank upper cover.

11. The water tank according to claim 9, wherein the sunken bump is provided at a middle or a front of the water tank upper cover in a front-and-rear direction, and a projection of the sunken bump on the bottom wall of the water tank upper cover has an oblong, circular, or elliptic shape.

12. The water tank according to claim 9, wherein the water tank further comprises a water-filling plug, the water tank upper cover defines a water-filling hole, and the water-filling plug is detachably provided at the water-filling hole.

13. The water tank according to claim 12, wherein the water tank further comprises a purification slow flow member provided at an inner bottom wall of the water tank lower cover.

14. The water tank according to claim 13, wherein the purification slow flow member is filter cotton.

15. The water tank according to claim 13, wherein the inner bottom wall of the water tank lower cover forms a limitation protruding rib to limit the purification slow flow member.

16. The water tank according to claim 15, wherein the water tank further comprises a mop fabric provided at an outer side of a bottom wall of the water tank lower cover.

17. The water tank according to claim 16, wherein the mop fabric is bound or snap-fitted with the water tank lower cover.

18. The water tank according to claim 1, wherein the water tank upper cover and the water tank lower cover are coupled by ultrasonic welding.

19. A sweeper comprising:
a water tank for a sweeper, the water tank configured to be pulled in and out at a rear side of a machine body of the sweeper, and the water tank comprising:
a water tank lower cover, a bottom of the water tank lower cover defining a containing groove;
a water tank upper cover coupled to the water tank lower cover, wherein the water tank upper cover and the water tank lower cover defines a water storage chamber;
a water tank release button provided at the containing groove and configured to disengage the water tank from the machine body when the water tank release button is triggered; and
a reset member having a first end coupled to the water tank release button and a second end coupled to the water tank lower cover;
wherein an inner bottom wall of the water tank release button forms a first positioning part, the bottom of the water tank lower cover forms a second positioning part corresponding to the first positioning part, and the reset member has the first end coupled to the first positioning part and the second end coupled to the second positioning part.

* * * * *